United States Patent
Reinosa

(10) Patent No.: US 8,945,400 B2
(45) Date of Patent: Feb. 3, 2015

(54) METHOD AND APPARATUS FOR A PARALLEL BYPASS FILTRATION SYSTEM FOR INTERNAL COMBUSTION ENGINES AND SIMILAR SYSTEMS

(75) Inventor: Adan Reinosa, Montebello, CA (US)

(73) Assignee: Pareto Point Industries, Inc., San Pedro, CA (US)

(*) Notice: Subject to any disclaimer, the term of this patent is extended or adjusted under 35 U.S.C. 154(b) by 515 days.

(21) Appl. No.: 12/925,921

(22) Filed: Nov. 1, 2010

(65) Prior Publication Data

US 2012/0080384 A1 Apr. 5, 2012

Related U.S. Application Data

(60) Provisional application No. 61/404,431, filed on Sep. 30, 2010.

(51) Int. Cl.
| | | |
|---|---|---|
| F01M 1/10 | (2006.01) | |
| B01D 27/10 | (2006.01) | |
| B01D 35/147 | (2006.01) | |
| B01D 35/30 | (2006.01) | |
| B01D 37/00 | (2006.01) | |
| B01D 35/18 | (2006.01) | |
| F01M 11/03 | (2006.01) | |

(52) U.S. Cl.
CPC .............. *F01M 1/10* (2013.01); *B01D 37/00* (2013.01); *B01D 27/103* (2013.01); *B01D 35/147* (2013.01); *B01D 35/306* (2013.01); *B01D 35/18* (2013.01); *F01M 2001/1014* (2013.01); *F01M 2011/033* (2013.01)

USPC .............. 210/790; 210/167.05; 210/416.5; 184/6.24; 123/196 A

(58) Field of Classification Search
CPC ...... F01M 1/10; B01D 27/103; B01D 35/147; B01D 35/306; B01D 37/00
USPC ............ 210/695, 749, 790, 167.05, 206, 209, 210/416.5, 444; 184/6.24, 6.25; 123/196 A
See application file for complete search history.

(56) References Cited

U.S. PATENT DOCUMENTS

| | | | | |
|---|---|---|---|---|
| 4,406,784 | A * | 9/1983 | Cochran | 210/167.05 |
| 4,452,695 | A * | 6/1984 | Schmidt | 210/167.05 |
| 4,561,395 | A * | 12/1985 | McMullen | 123/196 A |
| 6,349,693 | B1 * | 2/2002 | Reinosa | 123/196 A |
| 7,182,863 | B2 * | 2/2007 | Eilers et al. | 210/205 |

* cited by examiner

*Primary Examiner* — David A Reifsnyder
(74) *Attorney, Agent, or Firm* — Knobbe Martens Olson & Bear, LLP

(57) ABSTRACT

The present invention teaches a method and apparatus to quickly and inexpensively implement advanced filtration to engines and systems using spin-on oil filter by using a system adapter sandwiched between the spin-on oil filter and the engine block affixed by a nipple adapter. The adapter makes quick hydraulic connection to the inlet and outlet of a bypass grade or advanced filter, without modifications to the engine, as is the paradigm by traditional bypass filtration systems and without removing lubricant from the engine or system as is the paradigm of traditional bypass filtering systems. A differential pressure between said inlet and outlet side of the spin-on filter is complemented by a Venturi effect and fluid kinetic energy made possible by the special architecture of the nipple adapter and adapter.

2 Claims, 5 Drawing Sheets

METHOD AND APPARATUS FOR A PARALLEL BYPASS FILTRATION SYSTEM FOR INTERNAL COMBUSTION ENGINES AND SIMILAR SYSTEMS

CROSS REFERENCE TO RELATED APPLICATIONS

This application is entitled to the benefits of Provisional Patent Application Ser. No. 61/404,431 filed Sep. 30, 2010.

BACKGROUND OF THE INVENTION

The present invention relates to a new and quick method and apparatus to achieve bypass grade filtration in equipment using the widely known spin-on oil filter, where installation time is dramatically reduced and simplified, with no modifications, fewer parts, and lower weight.

DESCRIPTION OF PRIOR ART

Background

Bypass filtration is a well known field and many devices have been proposed to achieve fine oil filtration. Engines, and other industrial processes, require for their proper performance and longevity a degree of oil or hydraulic filtration that is a compromise between the size of the particles to be captured by the normally provided filter and the required flow of the fluid for the proper performance and longevity of the machine or system being protected. In automobiles, there is regularly only a motor oil filter described as a full flow filter. The full flow filter must flow an adequate oil volume and therefore the size of the particles that it traps cannot be too small or the risk of starvation of lubricant to the engine is a possibility, with catastrophic consequences to the engine. Therefore, most full flow filters, be it canister type or spin-on filters, trap particles in the order of 25 to 40 microns in cross section and above in an efficient manner. However, studies have pointed out that particles in the range of 2 to 25 microns are the most harmful to the engine due to the thickness of the lubricating film between rotating partners in an engine.

It is now apparent that in order to stop the mechanical degradation of an engine, the particles that the full flow filter does not trap must be removed by other means since in the presence of the full flow filter these particles move around the lubrication system unfettered and behave like liquid sandpaper with respect to rotating partners in an engine. In addition to the mechanical degradation caused by these particles, some particles are actually damaging to the lubricant in question degrading the additive package that renders lubricants ineffective in protecting the engine and its components. These additives get depleted because contaminant particles react chemically if they are left in suspension and dispersant additives are taxed by their presence, and these result in increased viscosity of the oil where parasitic pumping energy and rotational energy losses are increased accordingly. Yet another mode of degradation is the reaction of these particles that create acids and deplete the additives degrading what is widely regarded as an indication of the health of the oil, the Total Base Number, or TBN, which is a measure of how well the oil would protect the engine against the presence of acids in the oil. These acids eventually damage parts by pitting the working surfaces, among other damages.

The advent and increasing popularity of Diesel makes this type of filtration much more attractive since Diesel pollution controls relies on a process known as Exhaust Gas Recirculation, or EGR, in order to control the amounts of tailpipe emissions. This process, although effective for the control of pollution, taxes the oil by loading it with soot particles that find their way to the lubricating oil by means of blowby around piston rings of an engine, increasing oil viscosity and accordingly, parasitic energy losses. It is clear that the current filtration left alone to the functions and capabilities of the full flow filter leaves much to be desired and that an additional filtration device is needed in order to protect the machinery and systems that are being lubricated. A way to protect against this shortcoming is by the use of bypass filtration.

Bypass filtration is a proven and effective technology where a portion of total flow is diverted from the full flow filter and passed through a filter that has a higher filtering capability and then returning it to the engine or system usually to the crankcase or oil filler cap in a vehicle. These systems are popular in big rigs, or class 8 vehicles, in spite of being costly, difficult to install and maintain. However, the payback of such systems is assured considering the investment and the benefits returned due to their high mileage accrued during operation, which can be in the order of 100,000 miles in a year and even more in some cases. Passenger vehicles are not widely equipped or optioned with these systems because of their cost, complex installation and maintenance. However, the benefits of Advanced Filtration, researched by the US Department of Energy through the Argonne Laboratory, SAE and others, yield an impressive array of benefits, among them: oil life extended up to 10 times, oil filter full flow extended from 3 to 5 times, emissions reduced by up to 15% due to reduced friction and parasitic energy losses, and fuel efficiency increases in the order of 3 to 5% are cited. In addition to the benefits described above some other important benefits are less engine component wear with lower overhaul costs, a better performing engine over its operating life, vehicles with better resale value, and when adopted in great scale it would benefit our country's position with respect to foreign oil dependency. In spite of all the benefits, the complexity of installation and its cost are the main reasons why this current technology is not widely implemented in vehicles used by the general public and government fleets until the advent of the present invention where the cost of manufacture and installation has now been dramatically reduced.

The current methodology of connecting a bypass system is first connecting it to the oil pressure supply in an engine, usually found through a "tee" connection at the oil pressure sending unit. In some cases, this process requires a great expense since the oil pressure sending unit is usually buried right beneath the intake manifold in most modern engines, and even in older engines it is in a most remote location, making searching for the "tee" and plumbing of the system a costly and labor intensive proposition. For illustration purposes, in my personal car, a Porsche 911SC, in order to gain access and "tee" off the sending unit, the whole engine and transaxle must be dropped at a high cost that may not justify the benefits of the installation of a bypass filter system. In addition to that, the return of the purified oil, once the pressure side has been secured, must be done through modifications either to the sump plug at the bottom of the engine, which complicates future oil changes, or return the oil through the oil filling cap, again requiring modification and possible release of contaminants to the environment through shoddy installation.

The present invention solves all problems mentioned above through a method and apparatus where installation needs no modifications to the engine and connection time of the system has been recorded to be less than one minute, with a full installation requiring a bit more time. As can be appreciated, there is a significant body of prior art in this field that has been built over many years to achieve bypass filtration to engines and systems, representative of this prior art are the following US patents: U.S. Pat. No. 4,452,695, to Schmidt for a full-flow and bypass filter conversion system for internal combustion engines; U.S. Pat. No. 7,090,773, to Meddock and Swanson for a Coaxial full-flow and bypass oil filter; U.S. Pat. No. 6,951,606, to Cousineau and Allen for an Auxiliary filtration system. More illustrative examples for combining full flow and high density filtering have been integrated in one single unit, such as shown in Dahm, et al., U.S. Pat. No. 4,036,755. However, such a filtering system is not made in such a manner that is easily connected to the standard engine filtering system. Also, the high density portion of the filtering would only operate for a much shorter period of time before it would become clogged and the entire flow would then flow through the full-flow portion. Upon clogging of the full-flow portion, the by-pass valve would open and the oil would receive essentially no filtering. The same basic comments are true concerning Belgarde, et al., U.S. Pat. No. 2,995,253. Likewise, Beardsley, U.S. Pat. No. 2,680,520 shows a full-flow and part-flow filter combination. It has the same inherent problems as the previously described full-flow and part-flow filters. These problems may be exhibited by a recently developed combination full flow and a bypass grade Teflon sintered disc, with a rather small loading area for the bypass section, generously estimated to be limited to a cross section of the filter, such as U.S. Pat. No. 6,605,215, to Assion for a Hybrid spin-on oil filter, and No. 7,048,848, to Assion for, again, a Hybrid spin-on oil filter. These two patents describe a laudable and ingenious interpretation of an old idea whose execution fails to recognize the increased loading of contaminants and the small loading and service capacity of such, while still not fully addressing the environmental impact inherent in spin-on oil filters related to their illegal dumping and disposal. Yet other examples such as Kennedy, U.S. Pat. No. 2,843,268 is simply another variation of the combination full-flow, part-flow filter that also has the problems of life cycle and the pressure drop that can be utilized in the filtering system itself. Belgarde, U.S. Pat. No. 2,929,605, is simply another modification of the combined full-flow and part-flow oil filter. Allen, U.S. Pat. No. 2,966,296 again shows a combined full-flow and by-pass filter with strainer mounted in one single contiguous housing with only one by-pass valve.

Other examples can be found in U.S. Pat. No. 6,666,968, to Smith et al. for a Fluid filtration apparatus; U.S. Pat. No. 5,843,284, to Waters et al. for Two-stage oil bypass filter device, and U.S. Pat. No. 5,695,637, to Jiang et al. for a Combination full flow and bypass filter with venturi nozzle.

SUMMARY OF THE INVENTION

The present invention seeks and provides complementary bypass grade filtration to engines or equipment in a novel fashion by taking advantage of commonalities and well known structures such as those found in spin-on full flow oil filters and canisters. The typical bypass grade installation, as illustrated by prior art, is on the one hand a very intensive process both for material and labor. There is still the need to install the system at a point of high oil pressure from the system to be protected. However, the place where this pressure point is obtained is usually buried among other components, such as getting it from the oil pressure sending unit, where a point of connection can be made but at the high expense of labor and time, which translates to cost. In addition, once the pressure side is located and installed, a return to the oil has to be provided. This oil return is either to the bottom of the oil sump, requiring again material, labor and modifications, or return the oil to other location such as the oil filler cap, again requiring modifications to the system. Yet, on the other hand, an alternate solution proposes the replacement of the spin-on oil filter with a combination of full flow and bypass grade filter elements in combination, having the compromise of small loading areas and consequent short service interval.

The present invention therefore enjoys advantages over previous art: quick installation, inexpensive to manufacture and maintain, simple connection, large filtering loading area for a long service interval, complementary beneficial functions such as cooling and heating, flow detection, access to the oil system, loading detection, cooling, diagnostics, extended service intervals, small size, multifunctional, no moving parts, proven technology, no need to divert or sidestream oil from the engine as traditional bypass systems require, and more.

The present invention uses an adapter that is sandwiched between the spin-on oil filter and the engine block. It uses a modified nipple adapter to install the adapter. The nipple has the ability to make hydraulic connection to the outlet of the spin-on oil filter, or the oil stream of filtered oil out of the spin-on oil filter on its way to the lubrication system of the engine, let us call this the point of exhaust of the present invention. The pressure side is obtained by getting a hydraulic connection immediately before the oil goes into the spin-on oil filter, this is the intake to the present invention. There exist a natural differential pressure between said intake side and the exhaust side when oil is being filtered, aided by a Venturi effect made possible by the special architecture of the adapter nipple, and the kinetic energy in the fluid.

When connected to the normally provided stud for the spin-on oil filter in an engine, the net effect of interest to the present invention is that by simply placing the adapter at the point of connection of the spin-on oil filter, many of the necessary plumbing associated with the traditional bypass filter installation is obviated, as is the energy and labor intensive process of seeking for a pressure point and an oil return path back to the engine.

Further, the adapter now allows to simply connecting the element across hoses connected to intake and exhaust of the adapter. In experiments, the applicant has been successful in connecting such a functional system in less than one minute. In addition, the present invention allows for the added function of cooling just by simply converting the housing of the bypass filter into a heat exchanger either by air, forced air, as in an auxiliary fan and temperature control, or even installing a heat exchanger, or cooler, in parallel with the filter where a valve, manually or automatically, can switch added parallel oil flows, individual or in groups.

Also, by observing that the working oil will flow across the element, a temperature gauge can be placed in the circuit where it can serve as an analog signal to the health and loading condition of the bypass filter element. An alternate, or complementary method of loading detection, is to access the before and after pressure conditions of both the spin-on oil filter and bypass oil filter element and make comparisons of their differential pressures. Once the differential pressures are obtained, a definite service interval can be ascertained to aid in reducing the negative environmental footprint of both filters discarded before getting full service from them, by changing the filters only when is needed by positively knowing their loading conditions. Further, a visual indication of flow can help determine filter health by showing flow. Given those reasons above, the present invention is more resourceful, functional, and its strategy of connection leads it to be more readily accepted by the buying public, saving time, labor, the environment, and our domestic natural resources, where doing more with less is the new paradigm.

It is clear to the inventor that this simple device may be of wide acceptance by the public due to its benefits and its low cost, size, lack of moving parts, manufacturing simplicity and installation and therefore its widespread acceptance would have a positive impact in reducing the consumption of natural resources, increased fuel savings, less consumption of filters, lower emissions, and it is expected that the system will translate into green house gasses reductions, for which the value and trade credits have not been determined as of this writing; however, the applicant claims such future credits as part of the present invention and those will be further described in future claims.

DETAILED DESCRIPTION OF THE DRAWINGS

Figure 1:
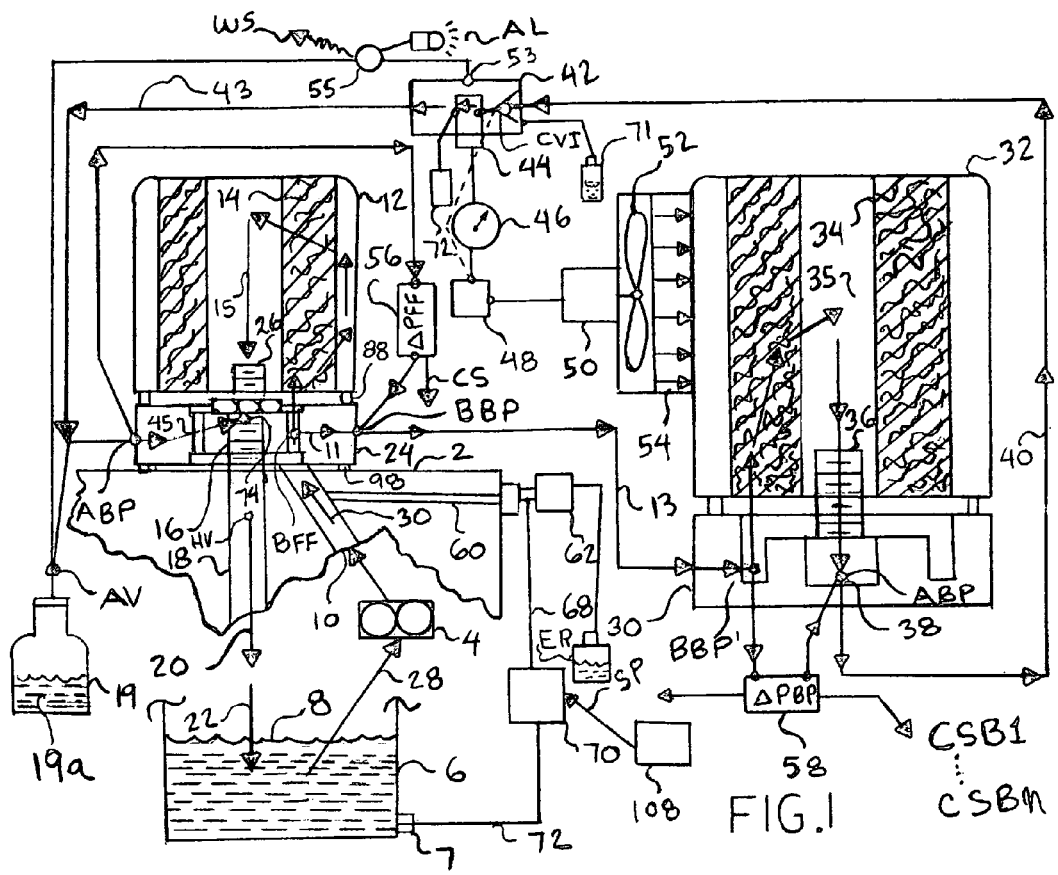
FIG. 1 Is a schematic view of the present invention showing connection to the engine, oil flows, accessories and other functional items.

Referring to FIG. 1, it illustrates the schematic connection of the present invention to an engine 2 and to various functional elements. Engine 2 is normally lubricated by a normally provided oil pump 4, said oil pump 4 function is to pressurize into engine 2 a lubricating oil 8, contained by a sump 6, via a pick-up tube path 28 into the inlet of said pump 4. Still referring to FIG. 1, pump 4 delivers a pressurized oil 30 via a discharge tube 10 towards the inlet of a normally provided spin-on oil filter 12 that is hydraulically connected to an inlet hydraulic point BFF. Access to hydraulic point BFF is achieved by including an adapter 24 of the present invention, sandwiched between engine 2 and filter 12, where a seal means 88 normally provided for filter 12, and an oil seal means 98 for adapter 24 are shown for completeness, and where an outlet hydraulic path 11 can be established to hydraulically connect point BFF and an external hydraulic point BBP. Hydraulic point BBP can now be connected via a hydraulic connection means 13 to a bypass adapter 30 of the present invention and connect to a hydraulic point BBP' which is hydraulically connected to the inlet of a high arrestance or high efficiency bypass grade filter 32 part of the present invention, which is equipped with a high efficiency filtration media 34. Still referring to FIG. 1, the media 34 is designed and available commercially to exclude contaminants suspended in the lubricating or oil 8 to a fine degree, even down to below 1 micron in cross sectional area. This means that any lubricating oil 8 that is diverted and made to flow across media 34 and into a hydraulic point 35 can be said to be analytically clean, meaning it has an unsurpassed degree of cleanliness, and therefore all impurities larger than about 1 micron have been stopped and retained in media 34.

Still referring to FIG. 1, oil 8 can be delivered from point BBP and across media 34 to point 35 as described above. Oil 8 at point 35 can now flow into a filter outlet threaded stud 36 towards a hydraulic point ABP where a hydraulic point 38 allows the oil to be channeled by a hydraulic connection means 40, through a manifold 42, which is connected to a hydraulic connection means 43 which is connected back to adapter 24 at a hydraulic point ABP. Still referring to FIG. 1, hydraulic point ABP is connected hydraulically by an inlet hydraulic path 45, which connects to an adapter injection nipple 26 equipped with a plurality of injection orifices 74 that allows for oil 8 to be injected into an engine gallery 18 and joining a full flow filtered oil stream 15 channeled by injection nipple 26 and into gallery 18 to form an engine oil flow 20, composed by oil flow 15 and purified oil flow through said plurality of injection orifices 74.

Still referring to FIG. 1, those familiar with the art of the current invention will recognize that upon close examination, the present invention proposes to remotely place the high arrestance filter 32 in parallel with the common spin-on or full flow filter 12, which is not the traditional "T" connection for oil sidestreaming and back to the sump or oil filler cap paradigm widely practiced. Those familiar with the art will further recognize that this arrangement is unusual since traditionally high grade filter 32 systems usually take a portion of pressurized lubricant 30 and diverts it through filter 32 and back to sump 6 by means of extensive modifications and labor to access pressure point BFF and back to sump 6, usually by means of a modified sump plug 7. This traditional method has been the paradigm of so called bypass filtration, where a parasitic drain of pressurized lubricant, usually 5 to 15% from the total flow of so much needed lubricant is removed from the operating flow. The present invention, with its parallel arrangement, does away with this potentially dangerous to the engine requirement. Further, by including adapter 24 and most important the adapter injection nipple 26, the return path as needed in traditional systems of the purified oil is obviated and associated plumbing is eliminated as is the labor intensive process of "T" connection usually to the oil pressure sending unit and the modifications to the oil sump 6 for the return connection.

Still referring to FIG. 1, the previous discussion is to emphasize the point that the present invention can be connected in a matter of one minute. The inventor has documented this in film because adapter 24 allows for the inlet and outlet of the high arrestance filter 32 to be connected quickly, by threading the adapter injection nipple 26 into a normally provided filter stud 16 in a matter of under a minute. The examiner is respectfully invited to visit www.paretopoint-.com and watch the one minute installation video. Further, those familiar with the art will be referred back to FIG. 1 and observe now that there are two mechanisms that establish flow of oil 8 through high efficiency filter 32: the first mechanism has to do with the inherent differential pressure across a full flow media 14 of filter 12, between points ABP and BBP, which can be detected or measured by a differential pressure detector 56 and indicated by a gradient "Delta" PFF; the second mechanism has to do with the architecture of adapter injection nipple 26, where the plurality of orifices 74 is strategically located at the point where orifices 74 are exposed to an area of very high lubricant velocity HV, where changes in cross-section sets a Venturi effect where it adds to the net pressure by creating a vacuum or suction that together with the differential pressure mechanism allows for the oil 8 to flow through high efficiency filter 32. It is now clear that the parallel flow of oil through filter 32 will purify the normal total volume of oil 8, generally between 4 and 12 quarts in regular vehicles, in the sump 6 very quickly, in fact, the applicant has seen and documented flows of one quart per minute, without optimization of the present invention, at 55 MPH cruising at 3,000 RPM, where statistically the whole 6 quarts of oil volume in the engine will experience purification from contaminants in a matter of a few minutes.

Figure 3:
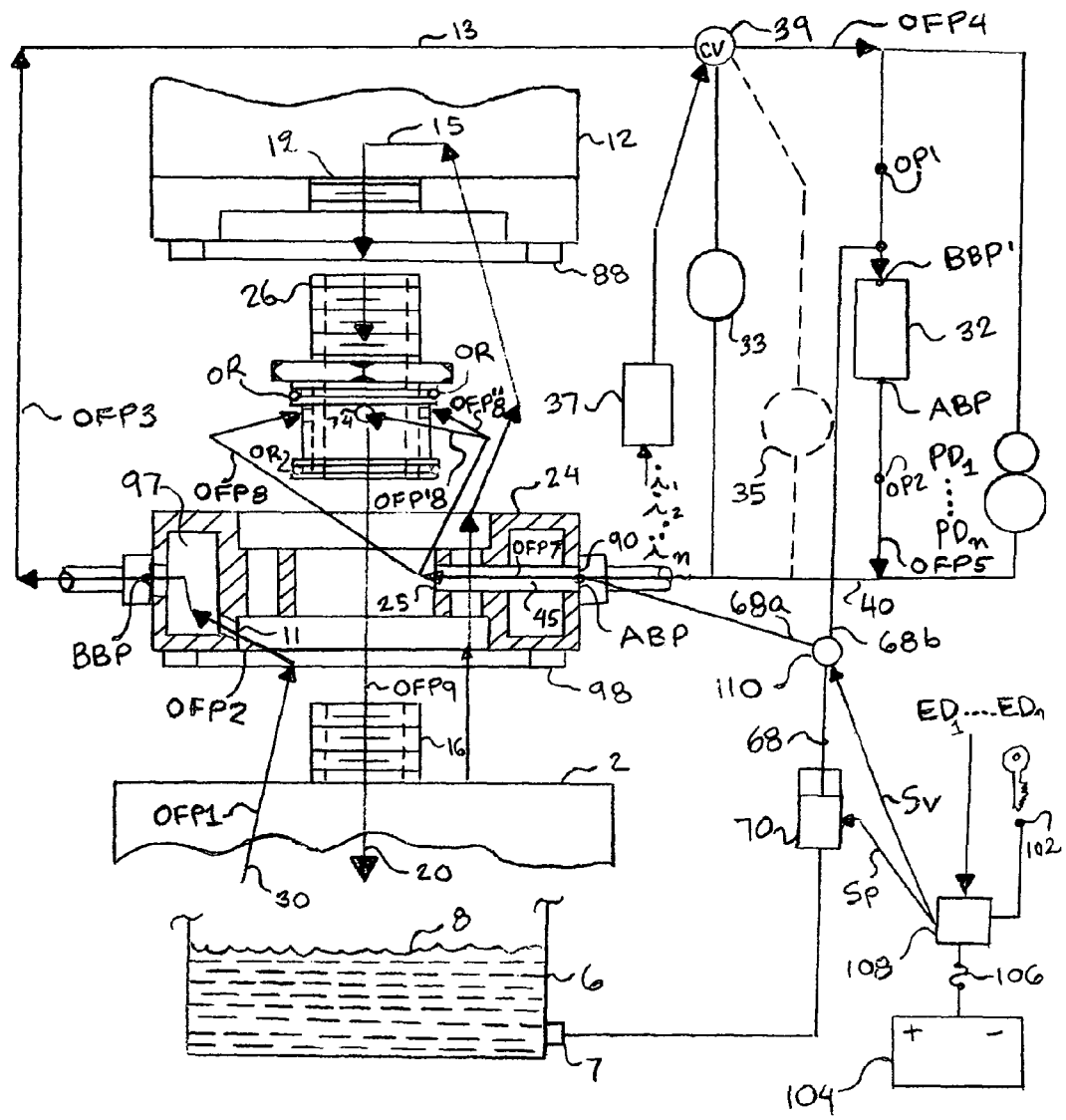
FIG. 3 Is a schematic diagram of the oil flows out of the engine via the adapter, through a device, and back into the engine via the modified adapter nipple where many accessories are shown.

Now referring to FIG. 3, it is shown diagrammatically how adapter 24 allows for the hydraulic connection of filter 32, however, this connection is not limited to just the function of filtering but rather the adapter 24 allows for the connection, or quick access to the engine lubrication system, of multiple parallel paths as shown by an oil cooler 33 and a potential parallel oil device 35, where a control valve 39 can switch oil flow to one or more devices upon receiving control signals from a controller 37, where a plurality of engine parameters such as temperature, pressure, oil condition, among others, represented by i1, i2 through in are fed into controller 37 where a routing decision is made to enable control valve 39 to switch the appropriate oil path and therefore the function of the device of the present invention. It is also clear, still referring to FIG. 3, that a plurality of parallel devices PD1 to PDn can now be enabled and connected as for instance a pump to boost oil flow towards the engine or on the opposite direction to establish recirculation of flow by way of example.

Figure 4:
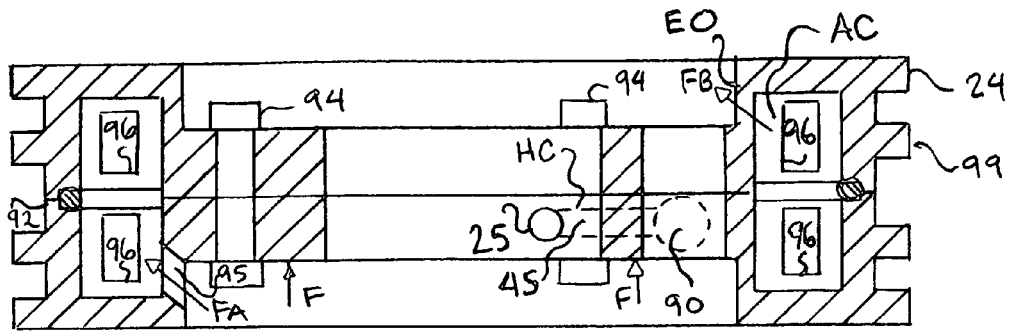
FIG. 4 Is a side view of the system adapter of the present invention that allows quick connection of the system to the engine.

Still referring to FIG. 3, the simplest apparatus of the present invention can be explained by following a path of oil starting with pressurized lubricant 30, where an oil flow path OFP1 from the engine pump reaches the adapter 24 where an orifice 11, similar to orifice 95 in FIG. 4, establishes a flow OFP2 into chamber 97 where it reaches point BBP which is in turn connected to hydraulic connection means 13 through which a flow OFP3 travels toward control valve 39 in FIG. 3, where a flow OFP4 emerges from valve CV and into filter 32, where it emerges as a flow OFP5 where it is routed by connection means 40 towards an intake port 90, or point ABP, to then establish a flow OFP7 through the inlet hydraulic path 45 and through an orifice 25 to establish a set of flows OFP8, OFP'8, and OFP"8, which collectively flow into the engine through the plurality of orifices 74 where all together aided by Venturi effect joins flow 15 to form a flow OFP9 where OFP9 is the sum of OFP8+OFP'8+OFP"8+Flow 15 which is the combination of purified oil and full flow oil that constitutes engine oil flow 20 into engine 2.

Figure 2:
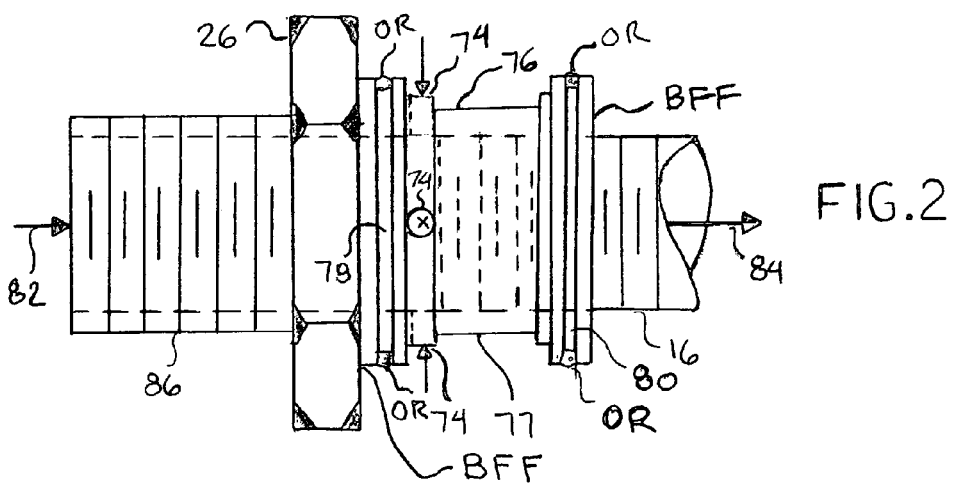
FIG. 2 Is a view of the adapter nipple that allows access to the purified oil from the advanced filter into the engine and secures the adapter to the engine.

Now referring to FIG. 2, it shows the adapter injection nipple 26, that allows for the adapter 24 to be affixed to the engine by threading into the normally provided filter stud 16, thereby affixing adapter 24 between the normally provided filter 12 and engine 2 in FIG. 1. Referring now to FIG. 2, adapter nipple 26 allows for the injection of purified oil through the plurality of orifices 74 which is isolated from downstream hydraulic point BFF by providing a sealing means grooves 78 and 80 which avoid the injection of unfiltered oil, by equipping said grooves with a sealing means OR, from points BFF as shown in FIG. 2, where injection nipple 26 is equipped with a groove 77 that allows for the connection of lubricating oil to be routed to orifices 74 and into engine 2 by joining a filtered oil flow 82, equivalent to flow 15 in FIG. 1, to constitute a total oil flow 84 into the engine galleries equivalent to flow 20. Those skilled in the art will now understand that this method defeats the traditional paradigms for bypass filtration: oil is bypassed, sidestreamed or removed, from the main flow at a rate of 5-15% of total flow to the engine, passed through a high efficiency media and returned to the sump or oil filler cap. The present invention obviates these paradigms with the added bonus of zero percent (0%) oil removed from the flow to the engine and injecting directly into the engine a portion of the oil that is cleaned to a high standard of purity where it is needed. In addition, since no orifice is added, by creating a flow of oil out of the engine in the traditional system, the present invention is safer for old or worn engines. In fact, it could be argued that the parallel connection of the high efficiency filter allows for a reduction of energy required to pump the oil volume required by the engine since the net resistance to flow is reduced where an analogy to a parallel electric circuit can be made since two resistors in parallel must always be smaller than any of its paralleled components, or that the net pressure needed to deliver an oil volume is therefore lower for the present invention, making the present invention energy efficient.

Figure 5:
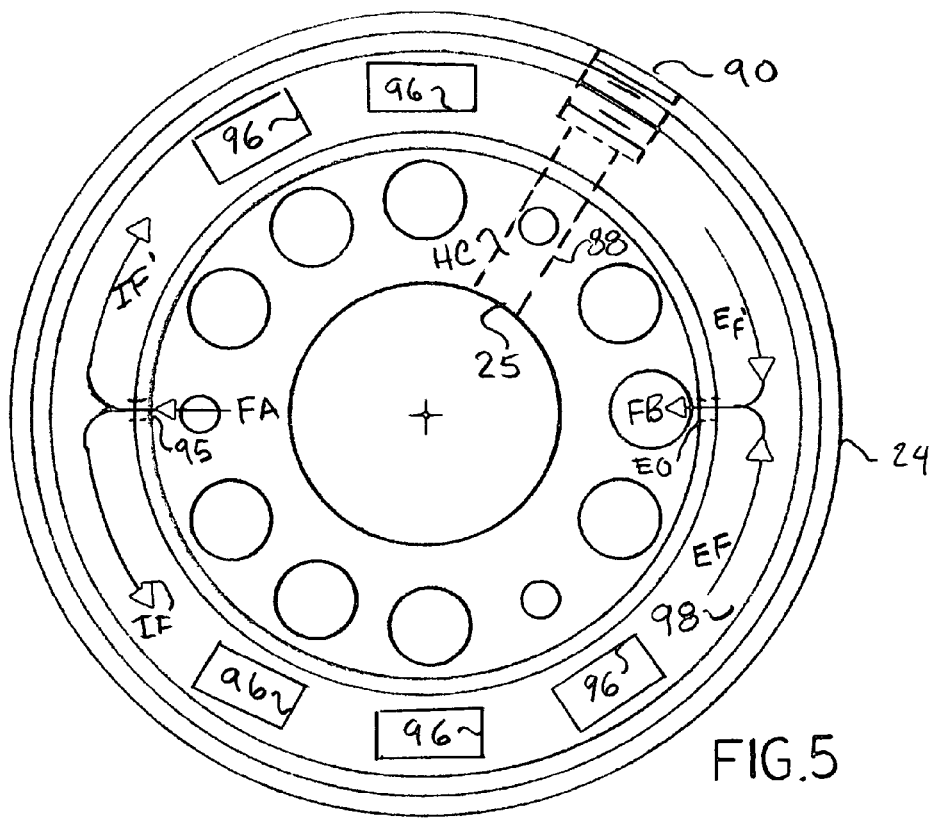
FIG. 5 Is a top view of the spin-on oil filter adapter showing the additive blocks and chamber and oil flows inside the chamber, where at least one intake and exhaust orifices are shown.

Now referring to FIG. 4, it shows a cross section of adapter 24 where orifice 25 is fluidly connected to groove 77 in FIG. 2 in order to route oil from filter 32. Referring to FIG. 4, adapter 24 shows a hydraulic channel HC fluidly connected to port 90 that essentially is the same hydraulic point as ABP in FIG. 1. Referring now to FIG. 4, adapter 24 is equipped with a set of fastening means 94 to provide access to a plurality of time release additive blocks 96 and a sealing means 92. Still referring to FIG. 4, additive blocks 96 can easily be also magnetic material to further enhance the filtering capabilities of the system, further, as shown in FIG. 1 positioning of adapter 24 in the fast flow of oil flow 30 allows for a stream of intake oil FA to access an adapter channel AC through a at least one intake orifice 95 and establish an exhaust oil FB as shown in FIG. 5 through a at least one exhaust orifice EO where the oil upon entering channel AC takes a set of oil flows IF and IF' where they establish contact with additive blocks or magnetic material 96 and in so doing establish a set of additive laden or magnetically filtered exhaust flows EF and EF' where they exhaust through said exhaust orifice EO. Adapter 24 can also be fitted with a set of cooling fins 99 to aid in thermal control, as shown in FIG. 4.

Now referring to FIG. 3, the skilled person in the art will observe that the present invention can be also equipped with an electronic controller 108 that is able to be uploaded with an operating program in order to enable a pump 70, automatically or on demand, by routing electric power from a normally provided battery 104 or other energy source through a conductor SP, by interpreting a plurality of engine data ED1 through EDn that when compared to stored algorithms in controller 108 makes the decision not only to operate pump 70 but can also discern to operate a control valve 110 though an electrical conductor SV that, among many choices or fluid paths, can choose in this case a path 68*b* that leads to the intake of high efficiency filter 32 in order to further purify oil 8, by routing it from sump 6 by modified adapter 7 and injecting it either unfiltered by a hydraulic path 68*a* for the purpose of pre or post lubricating engine 2, or to enhance the purification of oil 8 by routing it through path 68*b*. It is clear to those skilled in the art that hydraulic route 68*b* can also be directed to a turbocharger upon engine 2 switch off in order to lubricate components even when the engine is shut down in order to avoid coking of oil due to remaining heat content as is the case of oil coking in turbocharger bearings. It is also clear to those skilled in the art, that the device can be activated on demand by the user by a key means or switch 102, and that the system can be electrically protected from overload by a fusible link 106, and can also be automatically activated by controller 108.

Referring to FIG. 1, an additional function of the system is rerouting oil 8, by activation of pump 70 and evacuating oil 8 by means of an access port 62 where instead of the oil 8 going into engine 2 through an oil gallery path 60 for the purposes of pre or post lubrication by pump 70 activation; oil 8 gets directly evacuated into an environmentally responsible reservoir ER. Further, filter 32 can serve as an oil cooler, or heat exchanger, when equipped with a fan or heating device 50, where a propeller 52 moves a stream of cool air 54 that serves to cool the external skin or a heat sink of filter 32, where fan or heating device 50 is automatically controlled by a controller 48 which in turn receives signals from an oil temperature sensor or sending unit 44, where temperature from the oil is interpreted as in a gauge 46 for manual control. However, in the case that the vehicle is experiencing a very low temperature, then controller 48 can send a command to heating device 50 and heat the otherwise oil inside it to enable the present invention to work under such low temperature conditions. Still referring, to FIG. 1, oil is made to pass through manifold 42 where ports are provided to direct clean oil to devices such as a turbo bearing 72, or to an oil sampling bottle 71, or to serve as housing for sending unit 44.

Still referring to FIG. 1, manifold 42 is also able to house an oil conditioning probe 53, which sends oil data such as water intrusion, TAN number, dielectric constant, antifreeze intrusion, particulate content, additive depletion, viscosity, among others, to a processor 55, where the data can be reported locally or through a wireless signal WS to be relayed to remote maintenance locations for proper attention and action through well known wireless communication means. This particular feature proposes to alert the user to changing oil only when it is needed based on real-time quality measurements, rather than an arbitrary number such as the popular, yet environmentally damaging, every 3,000 miles oil change paradigm. Another function enabled by the system is the addition of additives once processor 55 detects an abnormal condition where a signal can be relayed to an additive valve AV in FIG. 1, where oil additive can be provided to the engine oil 8 from an additive reservoir 19 by allowing an additive 19a to be routed by valve AV and into the oil stream by controlling the length of time or frequency that valve AV remains open or closed.

Still referring to FIG. 1, another complementary function can be achieved by monitoring a differential pressure "Delta" PFF by differential pressure device 56 where the pressure between BBP and ABP, or the pressure between before and after filter media 14, is detected and relayed via a change signal CS where the pressure is compared against a predetermined pressure known as "bypass pressure" where if this pressure is achieved then filter 12 is considered saturated or used-up and it is changed only after this "bypass pressure" is reached, thereby avoiding the unnecessary consumption of filters by extracting the last bit of utility from the filter by real time monitoring of its loading, or bypass pressure. Still referring to FIG. 1, the same can be said for filter 32 where the monitoring of a differential pressure "Delta" PBP by a differential pressure device 58 where the pressure differential between BBP' and ABP, the before and after pressure across media 34 respectively, is compared against a predetermined pressure that indicates high loading, or end of service life or filter 32. Those skilled in the art can now appreciate this function as enabling a plurality of change signals CSB1 through CSBn where each iteration of signal CSB can now be made, using well known technology, to enable the next clean filter when the previous bypass filter element 32 becomes loaded, or has reached the end of its useful life.

Now referring to FIG. 3, an orifice restriction OP1 is shown before filter 32, likewise an orifice restriction OP2 is shown after filter 32, these orifices are located before or after depending on the application of flow desired across the filter 32. For example, OP1 is before pump 70 outlet to point BBP', should orifice restriction be after point BBP' pump 70 would have to work very hard to push lubricant 8 across filter 32. Still in FIG. 3, if a system has no pump, then the desired location of the orifice restriction should be the restriction OP2.

Certain observations by the inventor on the behavior of the operation in parallel of the full flow filter 12 and the bypass grade filter 32 is that they perform the filtration of lubricant 8 in some way like a "buddy system" where flows of oil 8 are divided inversely proportional to the resistance across the media where the net result is a back and forth sharing of the filtering load since oil will flow according to the least resistant media. The present invention proposes that the parallel operation of the filters optimizes the utilization during operation since the filters will load to the point where one will actively become loaded and in so doing will eventually shift the filtering load to the one that does not load passing the load of filtration back and forth until both media become loaded to the point of bringing a signal when they both reach their bypass pressure setting or maximum load indication, where utilization of both filters is maximized.

Now referring to FIG. 1, the manifold 42 can also include a check valve interrupter switch CVI whose function is to alert the user as to the status of filter 32. Filter 32 is usually designed without a bypass valve, and this is due to the fact that since it is always put to draw 5-15% of the main flow, it is not required to bypass to protect the engine against a no oil flow condition. However, how does a user know that the bypass filter is no longer useful? In addition to indicator Delta PBP, the present invention provides for valve switch CVI, so that if the filter becomes clogged to the point where flow is so small that the check valve interrupter CVI activates, a filter alarm load indicator AL sends an alarm input to controller 48 for proper reporting. Those skilled in the art will recognize that wireless signal WS can also be made to upload files, graphics, and other data applications to devices such as the Iphone by Apple. An application that receives uploaded information on the parameters of the oil, load status of filter, is proposed as a complement to the system where local real-time report of the condition of oil, full flow and bypass or advanced filters is possible.

Figure 6:
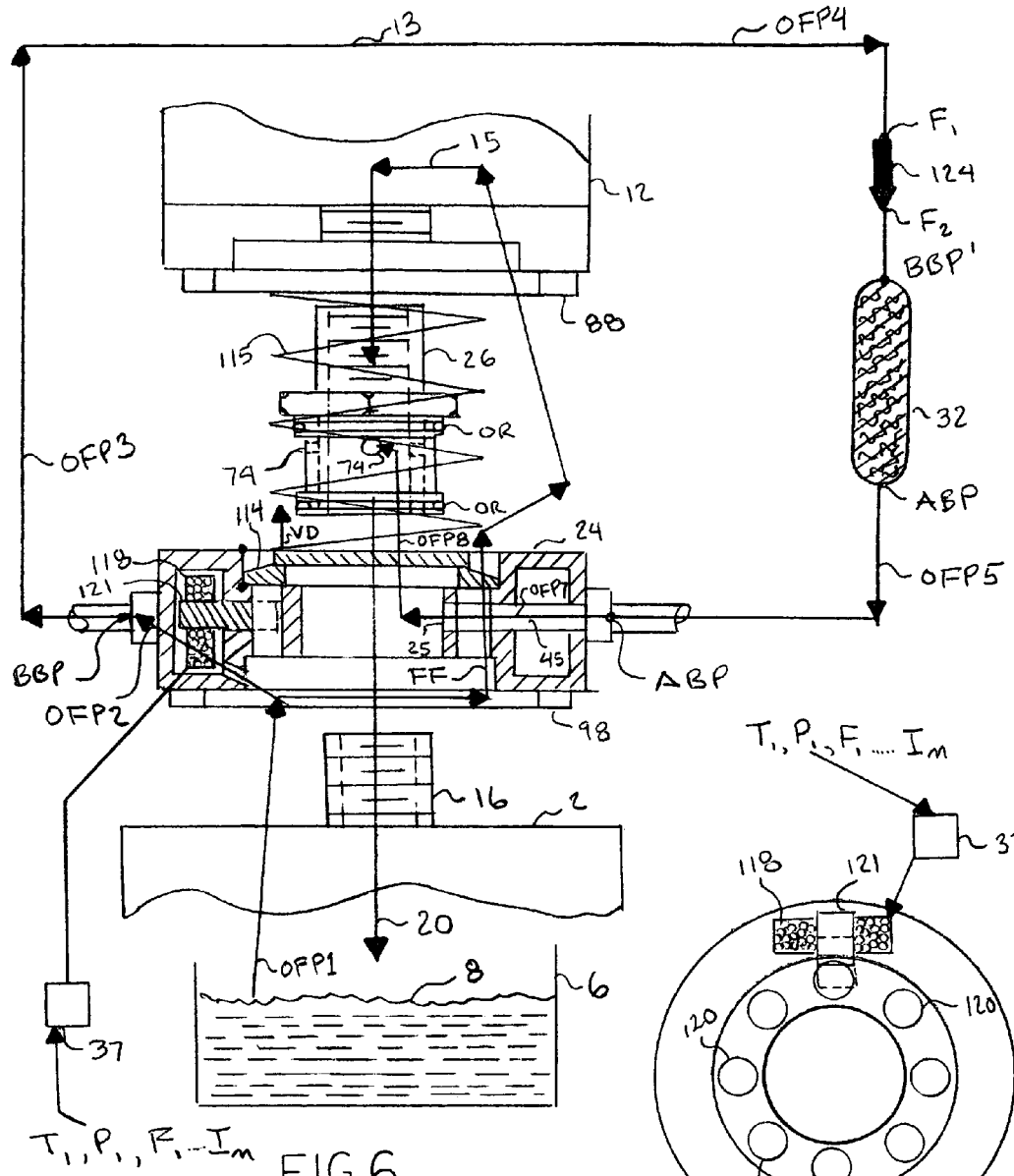
FIG. 6 Is a side view of a simplified embodiment where a biasing stopper and a solenoid valve are used to provide automatic pressure feedback and bias flow to the high efficiency bypass grade filter.
Figure 7:
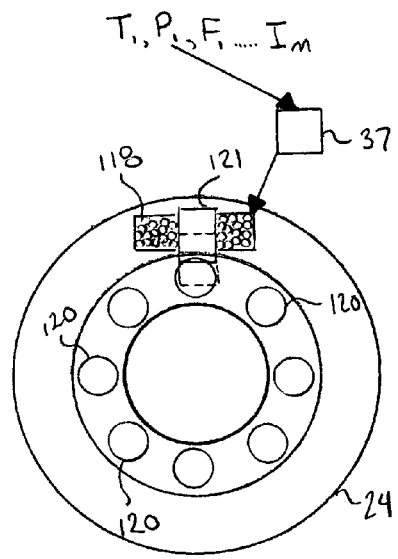
FIG. 7 Is a top view of the typical flow orifice arrangement where the solenoid valve is shown in an schematic diagram.

Now referring to FIG. 6, where like numbers refer to like parts, shows an schematic of a simplified embodiment where flow though the high efficiency filter 32 can be optimized by the introduction of a biasing valve 114 that is biased against adapter 24 by means of a calibrated compression spring 115, where working pressure across filter 32 can be further increased across points BBP' and ABP due to the valve 114 opposing flow FF where valve 114 is sealingly biased against a plurality of orifices 120 as shown in FIG. 7. Now referring to FIG. 6, the valve 114 is able to move in the direction of VD when flow FF is established through the plurality of orifices 120. The net effect for the present embodiment is that the working pressure across filter 32 can be increased so that flow through filter 32 is maintained as the filter loads with contaminants and the working pressure is augmented by the effect of valve 114. Still referring to FIG. 6, it can also be observed as an alternative or complement to valve 114 that a solenoid operated plunger 121 electrically biased by coil 118 can also serve to augment the pressure across filter 32. For simplicity, only one solenoid is shown, but those skilled in the art can now realize that multiple coils can be installed so that the effective flow area of the plurality of orifices 120 can be decreased and therefore increase in steps the working pressure across filter 32, where controller 37 can be made to read a plurality of inputs such as temperature T1, pressure P1, flow F1, among other relevant inputs, across the filter and determine the frequency or area to be closed to bias an increase of oil flow across filter 32. The activation of solenoid 118 and as a consequence plunger 121 can be made by controller 37. It is clear to those skilled in the art that the effect either passive, as spring biased valve 114 or the automatic control by controller 37 of solenoid 118 and plunger 121, can be achieved by many means with the net result of increasing the differential pressure across the high efficiency filter in order to bias more oil through it.

Figure 8:
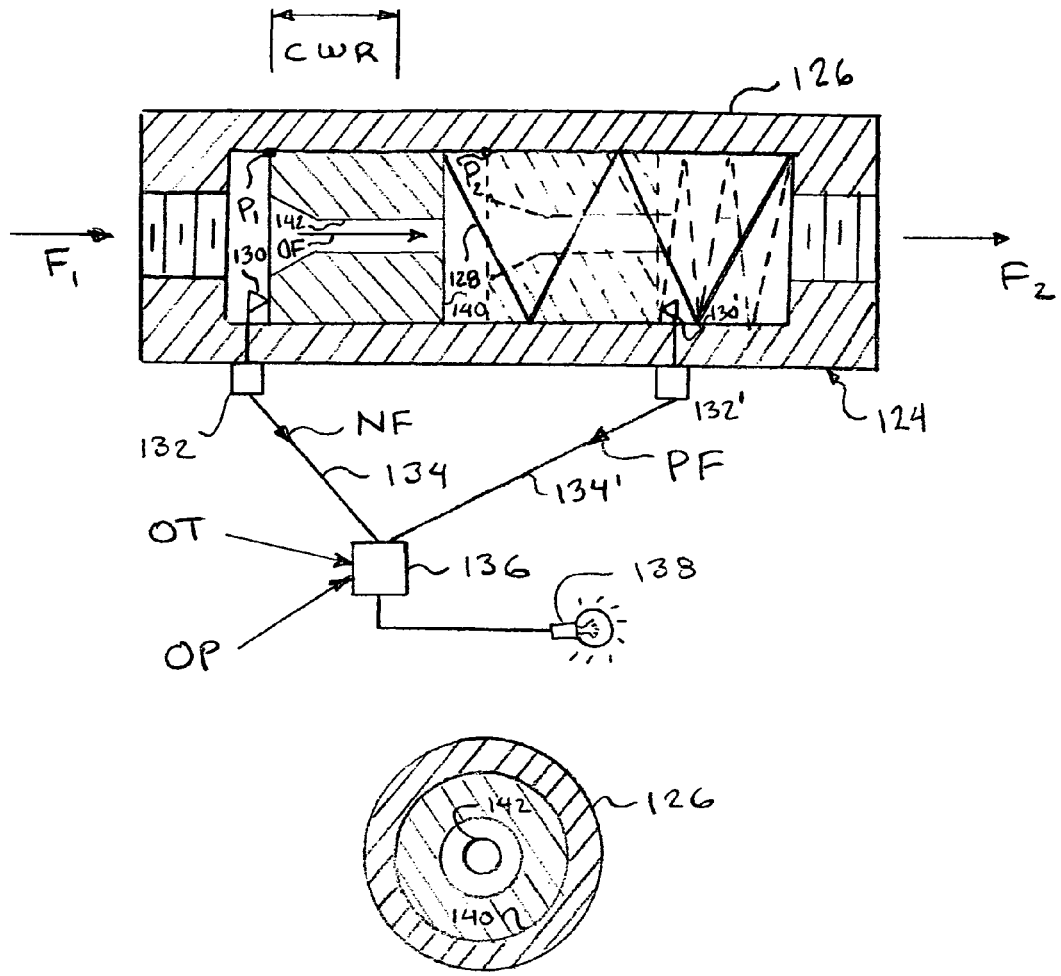
FIG. 8 Is a side view of a flow detector to indicate flow conditions electrically, visually, or both.

Now referring to FIG. 6, a flow detector 124 is installed in series with connecting means 13 in order to monitor the flow of oil through filter 32. The detector 124 can be designed with electric contacts to relay an electric signal alerting to flow or no flow. Likewise, flow detector 124 can provide visual indication of flow such as the indicator shown in FIG. 8, where a housing 126 is made to connect to the line connected in series with filter 32 in FIG. 6 and to contain a flow detecting or metering piston 140 which is biased to a rest position P1 by a biasing spring 128 of known characteristics such that when a set of flows F1 and F2 are present, they establish an equal flow OF through an orifice 142, flow F1 is made to flow through the piston 140 by equipping metering piston 140 with said orifice 142 of known dimensions and calibrated to offer an opposing force to Flow F1 such than when F1 is sufficiently large, the metering piston will be moved against the biasing force of spring 128 to a new position P2 where piston 120 can make a rest position or no flow switch 130 designed to send a no flow signal NF to a flow detecting controller 136 by a connector 132 and connecting means 134. Likewise, still referring to FIG. 8, piston 140 when moved to position P2 can make contact with a positive flow 130' which is designed to send a positive flow signal PF though a connector 132' and connecting means 134' to flow detecting controller 136, where signals NF and PF can be made to activate a flow signal indicator 138 after analyzing inputs from the engine such as a flow oil temperature OT, an oil pressure OP, among another signals. A visual method to determine no flow condition is equipping flow detector 124 with a clogged window report length CWR, where piston 140 can be made visible at position P1 during engine or system operation and if piston 140 is visible at the CWR then upon parameter confirmation OT, OP, it may be determined that no flow exists and that will be indication of filter in FIG. 6 to be clogged and needed to receive service.

It will be understood that each of the elements described above, or two or more together may also find a useful application in other types of methods differing from the type described above.

While certain novel features of this invention have been shown and described and will be pointed out in future claims, it is not intended to be limited to the details above, since it will be understood that various omissions, modifications, substitutions and changes in the forms and details of the device illustrated and its operation can be made by those skilled in the art without departing in any way from the spirit of the present invention.

I claim:

1. A method for providing parallel filtration in an internal combustion engine, said engine having a lubricating oil, a normally provided spin-on oil filter whose inlet is hydraulically connected to a normally provided oil pump via a discharge tube and said normally provided spin-on oil filter whose outlet is hydraulically connected to a normally provided engine gallery via a normally provided filter stud, said method comprising the steps of:
   a. providing an adapter interposed between said engine and said normally provided spin-on oil filter for hydraulically connecting to said discharge tube and said engine gallery;
   b. providing a first hydraulic connection means to connect an upstream end of said first hydraulic connection means to said discharge tube via said adapter and to connect a downstream end of said first hydraulic connection means to an inlet of a high efficiency filter;
   c. providing a second hydraulic connection means to connect a downstream end of said second hydraulic connection means to said engine gallery via said adapter and to connect an upstream end of said second hydraulic connection means to an outlet of said high efficiency filter;
   d. providing an adapter injection nipple to affix said adapter to said engine and to provide a hydraulic connection through a plurality of injection orifices between said engine gallery and said second hydraulic connection means downstream end by threading said adapter injection nipple to said normally provided filter stud; and
   e. providing said adapter injection nipple whose functional architecture locates said injection orifices immediately contiguous to an area of high velocity lubricating oil from said spin-on oil filter outlet which is channeled fluidly unobstructed by and through said adapter injection nipple whereby a first effect, a Venturi or vacuum effect is established which in cooperation with a second effect, a differential pressure effect across said spin-on oil filter, furthered by a third effect, a fluid kinetic energy effect captured by said adapter fluidly connected to said discharge tube, said three effects promote the net result of lubricating oil flow through said high efficiency filter and into said engine gallery;
whereby said high efficiency filter is connected in parallel to said normally provided spin-on oil filter quickly, without modifications, including no narrowing or obstructions of said adapter nipple conduit flow area, to said engine, and without removing any amount of said lubricating oil from said engine gallery.

2. The method of claim 1 wherein said high efficiency filter in step b is equipped with a high efficiency filtration media with a rating range between 100 to below 1 micron in cross sectional area.

* * * * *